US012570439B2

(12) United States Patent
Kaminaga et al.

(10) Patent No.: US 12,570,439 B2
(45) Date of Patent: Mar. 10, 2026

(54) GAS-BARRIER MULTILAYER BODY AND PACKAGING BAG

(71) Applicant: TOPPAN Holdings Inc., Tokyo (JP)

(72) Inventors: Junichi Kaminaga, Tokyo (JP);
Yoshiki Koshiyama, Tokyo (JP);
Yumiko Kojima, Tokyo (JP); **Rika
Ishii**, Tokyo (JP)

(73) Assignee: TOPPAN Holdings Inc., Tokyo (JP)

( * ) Notice: Subject to any disclaimer, the term of this
patent is extended or adjusted under 35
U.S.C. 154(b) by 365 days.

(21) Appl. No.: 18/246,923

(22) PCT Filed: Sep. 29, 2021

(86) PCT No.: PCT/JP2021/035874
§ 371 (c)(1),
(2) Date: Mar. 28, 2023

(87) PCT Pub. No.: WO2022/071399
PCT Pub. Date: Apr. 7, 2022

(65) Prior Publication Data
US 2023/0365304 A1 Nov. 16, 2023

(30) Foreign Application Priority Data
Sep. 30, 2020 (JP) ................................. 2020-165035

(51) Int. Cl.
B65D 30/20 (2006.01)
B32B 27/30 (2006.01)
(Continued)

(52) U.S. Cl.
CPC ............ B65D 31/10 (2013.01); B32B 27/306
(2013.01); B65D 31/02 (2013.01); **B65D
65/38** (2013.01);
(Continued)

(58) Field of Classification Search
CPC ........ B65D 31/10; B65D 31/02; B65D 65/38;
B65D 2565/385; B65D 2565/387;
(Continued)

(56) References Cited

U.S. PATENT DOCUMENTS

2001/0038894 A1* 11/2001 Komada ................. B32B 15/08
428/34.6

FOREIGN PATENT DOCUMENTS

JP        H07-223686 A        8/1995
JP        H07-256811 A       10/1995
(Continued)

OTHER PUBLICATIONS

English machine translation for JPH10194325 (Year: 1998).*
(Continued)

*Primary Examiner* — Michael C Miggins
(74) *Attorney, Agent, or Firm* — Studebaker Brackett
PLLC

(57) ABSTRACT

Provided is a gas barrier laminate being capable of hermetic
sealing by heat sealing and having a paper substrate and a
vapor-deposited layer, in which the paper substrate has a
basis weight of 30 to 100 g/m², and the water vapor
transmission rate and the oxygen transmission rate of the gas
barrier laminate are in specific ranges, respectively.

10 Claims, 2 Drawing Sheets

(51) Int. Cl.
  *B65D 30/08* (2006.01)
  *B65D 65/38* (2006.01)
(52) U.S. Cl.
  CPC .. *B65D 2565/385* (2013.01); *B65D 2565/387*
  (2013.01)
(58) Field of Classification Search
  CPC ...... B65D 65/40; B32B 27/306; D21H 19/08;
  D21H 19/20; D21H 19/82; D21H 19/824;
  D21H 27/10; Y02W 20/80
  See application file for complete search history.

(56) References Cited

FOREIGN PATENT DOCUMENTS

| | | |
|---|---|---|
| JP | 2002-037312 | 2/2002 |
| JP | 2010-207117 A | 9/2010 |
| JP | 2014-141014 | 8/2014 |
| JP | 2020-069783 | 5/2020 |
| WO | 2011/003565 A2 | 1/2011 |
| WO | 2017/089508 A1 | 6/2017 |
| WO | 2020/152753 A1 | 7/2020 |

OTHER PUBLICATIONS

International Search Report issued in International Application No. PCT/JP2021/035874 dated Dec. 14, 2021.
English Translation of IPRP (PCT/IB/338 and PCT/IB/373) (Apr. 13, 2023 and Mar. 28, 2023) and the Written Opinion of ISA (PCT/ISA/237) issued in International Application No. PCT/JP2021/035874 dated Dec. 14, 2021 (7 pages).
Extended European Search Report issued in counterpart European Application No. 21875699.7 dated Feb. 1, 2024.

* cited by examiner

GAS-BARRIER MULTILAYER BODY AND PACKAGING BAG

CROSS REFERENCE TO RELATED APPLICATIONS

This application is a 35 USC 371 U.S. national stage application of International Application No. PCT/JP2021/035874, filed on Sep. 29, 2021, which claims the priority benefit to Japanese Application No. 2020-165035, filed on Sep. 30, 2020. The International Application and the Japanese Application are incorporated by reference herein in their entirety.

TECHNICAL FIELD

The present invention relates to a gas barrier laminate and a packaging bag.

BACKGROUND ART

In many fields such as foods, beverages, pharmaceuticals, and chemicals, packaging materials are used according to the contents of each product. Packaging materials are required to have properties for preventing transmission of oxygen, water vapor, and the like (gas barrier properties), which are causative of degeneration of the contents.

In recent years, in view of growing environmental awareness stemming from marine plastic debris problems and the like, the momentum toward plastic reduction is building up. From the viewpoint of reducing the amount of use of plastic materials, it has been investigated to use paper instead of plastic materials in a variety of fields. For example, in the following Patent Literature 1, a gas barrier laminate in which barrier layers are laminated on paper is disclosed.

CITATION LIST

Patent Literature

Patent Literature 1: Japanese Unexamined Patent Publication No. 2020-69783

SUMMARY OF INVENTION

Technical Problem

Since paper has crease retaining properties (also referred to as dead holding properties), paper has a feature that processing is easy. However, according to an investigation of the inventors of the present invention, it has been found that in a case where packaging bags having more acute-angled creases (pillow packaging, three-sided seal packaging, and gusset packaging) are used, there is still room for improvement from the viewpoint that cracks are generated in the barrier layer so that the gas barrier properties are deteriorated.

Furthermore, from the viewpoint of the Law for Promotion of Effective Utilization of Resources, it has been required to reduce the amount of use of plastic materials even in gas barrier laminates.

The present invention was achieved in view of the above-described circumstances, and it is an object of the invention to provide a gas barrier laminate that has crease retaining properties, which is a feature of paper, has sufficient gas barrier properties even after being folded, and contributes to a reduction in the amount of use of plastic materials, and to provide a packaging bag including this gas barrier laminate.

Solution to Problem

The present invention provides a gas barrier laminate being capable of hermetic sealing by heat sealing and having a paper substrate and a vapor-deposited layer, in which the paper substrate has a basis weight of 30 to 100 $g/m^2$; a water vapor transmission rate is 3 $g/m^2 \cdot day$ or less at 40° C. and 90% RH; an oxygen transmission rate is 2 $cc/m^2/d/atm$ or less at 30° C. and 70% RH; the water vapor transmission rate obtained by folding the gas barrier laminate with the paper substrate placed on the outer side, rolling a roller having a weight of 2 kg thereon one time, opening the fold, and making measurement, is 4 $g/m^2 \cdot day$ or less at 40° C. and 90% RH, while the oxygen transmission rate obtained in the same manner is 5 $cc/m^2/d/atm$ or less at 30° C. and 70% RH; the water vapor transmission rate obtained by folding the gas barrier laminate with the paper substrate placed on the inner side, rolling a roller having a weight of 2 kg thereon one time, opening the fold, and making measurement, is 4 $g/m^2 \cdot day$ or less at 40° C. and 90% RH, while the oxygen transmission rate obtained in the same manner is 5 $cc/m^2/d/atm$ or less at 30° C. and 70% RH; and a weight of the paper substrate is 47% by mass or more with respect to the gross weight of the gas barrier laminate.

The weight of the paper substrate may be 60% by mass or more with respect to the gross weight of the gas barrier laminate.

The present invention also provides a gas barrier laminate being capable of hermetic sealing by heat sealing and having a paper substrate and a vapor-deposited layer, in which the paper substrate has a basis weight of 30 to 100 $g/m^2$; a water vapor transmission rate is 3 $g/m^2 \cdot day$ or less at 40° C. and 90% RH, an oxygen transmission rate is 2 $cc/m^2/d/atm$ or less at 30° C. and 70% RH; the water vapor transmission rate obtained by folding the gas barrier laminate with the paper substrate placed on the outer side, rolling a roller having a weight of 2 kg thereon one time, opening the fold, and making measurement, is 4 $g/m^2 \cdot day$ or less at 40° C. and 90% RH, while the oxygen transmission rate obtained in the same manner is 5 $cc/m^2/d/atm$ or less at 30° C. and 70% RH; the water vapor transmission rate obtained by folding the gas barrier laminate with the paper substrate placed on the inner side, rolling a roller having a weight of 2 kg thereon one time, opening the fold, and making measurement, is 4 $g/m^2 \cdot day$ or less at 40° C. and 90% RH, while the oxygen transmission rate obtained in the same manner is 5 $cc/m^2/d/atm$ or less at 30° C. and 70% RH; and a thickness of the paper substrate is 60% or more with respect to the entire gas barrier laminate.

The thickness of the paper substrate may be 70% or more of the thickness of the entire gas barrier laminate.

The gas barrier laminate may have a layer including a polyolefin having at least one selected from a carboxyl group, a salt of a carboxyl group, a carboxylic acid anhydride group, and a carboxylic acid ester, on a surface of the vapor-deposited layer on the opposite side from the paper substrate.

The gas barrier laminate may have a layer including a polyvinyl alcohol-based resin between the paper substrate and the vapor-deposited layer.

The present invention also provides a packaging bag including the gas barrier laminate according to the present invention, the packaging bag having a heat seal strength of 3 N/15 mm or greater.

The packaging bag may have a folded part.

Advantageous Effects of Invention

According to the present invention, a gas barrier laminate that has crease retaining properties, which is a feature of paper, has sufficient gas barrier properties even after being folded, and contributes to a reduction in the amount of use of plastic materials, as well as a packaging bag including this gas barrier laminate can be provided.

DESCRIPTION OF EMBODIMENTS

Hereinafter, embodiments of the present invention will be described in detail with reference to the drawings as necessary. However, the present invention is not intended to be limited to the following embodiments.

<Gas Barrier Laminate>

Figure 1:
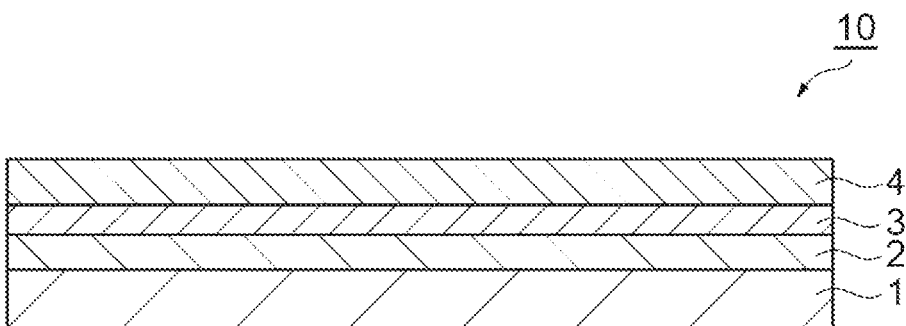
FIG. 1 is a schematic cross-sectional view of a gas barrier laminate according to an embodiment of the present invention.

The gas barrier laminate according to the present embodiment is a gas barrier laminate that has a paper substrate and a vapor-deposited layer and is capable of hermetic sealing by heat sealing. The gas barrier laminate 10 according to the present embodiment may have, for example, as shown in FIG. 1, at least a paper substrate 1, a layer 2 including a polyvinyl alcohol-based resin, a vapor-deposited layer 3, and a layer 4 including a polyolefin. Furthermore, for example, the gas barrier laminate may further have a layer including a polyolefin between the paper substrate and the vapor-deposited layer, there may be two or more vapor-deposited layers, and the layer including a polyolefin and the layer including a polyvinyl alcohol-based resin may also exist as two or more layers.

[Paper Substrate]

The paper substrate is not particularly limited and may be appropriately selected according to the use application of the packaging material to which the gas barrier laminate is applied. Specific examples of the paper substrate include high-quality paper, special high-quality paper, coated paper, art paper, cast coated paper, imitation vellum paper, kraft paper, and glassine paper.

The basis weight of the paper substrate is 30 to 100 g/m², preferably 35 to 90 g/m², and more preferably 40 to 80 g/m². When the basis weight of paper is 30 g/m² or more, the physical strength and processing suitability as the packaging bag are satisfactory and preferable, and when the basis weight is 100 g/m² or less, the flexibility and productivity as the packaging bag are satisfactory and preferable.

The weight of the paper substrate is 47% by mass or more, preferably 50% by mass or more, more preferably 60% by mass or more, and even more preferably 70% by mass or more or 80% by mass or more, based on the gross weight of the gas barrier laminate. When the weight of the paper substrate is 47% by mass or more based on the gross weight of the gas barrier laminate, the amount of use of plastics can be sufficiently reduced, and when the weight of the paper substrate is 50% by mass or more, the gas barrier laminate can be entirely made of paper, and at the same time, the gas barrier laminate has excellent recyclability. The upper limit of the weight of the paper substrate is not particularly limited, and the upper limit may be, for example, less than 100% by mass or may be 90% by mass or less.

The thickness of the paper substrate is, for example, preferably 60% or more, and more preferably 70% or more, with respect to the thickness of the entire gas barrier laminate. When the thickness of the paper substrate is 60% or more with respect to the thickness of the entire gas barrier laminate, the amount of use of plastics can be sufficiently reduced, the gas barrier laminate can be entirely made of paper, and at the same time, the gas barrier laminate has excellent recyclability. The upper limit of the thickness of the paper substrate is not particularly limited, and the upper limit may be, for example, less than 100% or may be 90% or less. The thickness of the paper substrate may be, for example, 30 μm or more and 100 μm or less and may be 35 μm or more and 80 μm or less.

The paper substrate may be provided with a coat layer at least on the side that is in contact with the vapor-deposited layer that will be described below. By providing a coat layer, the role of a filler that fills up the surface unevenness of paper can be accomplished, and the vapor-deposited layer can be formed uniformly without defects. In the coat layer, for example, various copolymers such as polyolefin-based, styrene-butadiene-based, styrene-acrylic, and ethylene-vinyl acetate-based copolymers; a polyvinyl alcohol-based resin, a cellulose-based resin, paraffin (WAX), and the like may be used as binder resins, and for example, clay, kaolin, calcium carbonate, talc, and mica may be included as loading materials.

The thickness of the coat layer is not particularly limited; however, for example, the thickness may be 1 to 10 μm, or 3 to 8 μm.

<Vapor-Deposited Layer>

The vapor-deposited layer is a layer that has a role of imparting water vapor barrier properties to the gas barrier laminate and is obtained by vapor-depositing a metal or a metal oxide. The vapor-deposited layer may be a layer obtained by vapor-depositing aluminum or may be a layer including aluminum oxide ($AlO_x$), silicon oxide ($SiO_x$), or the like. By providing the vapor-deposited layer, the gas barrier properties of the gas barrier laminate can be enhanced, and the amount of use of plastics in the gas barrier laminate can be reduced.

The thickness of the vapor-deposited layer may be appropriately set according to the use application; however, the thickness is preferably 10 nm or more, 30 nm or more, or 50 nm or more, and may be 500 nm or less, 100 nm or less, or 80 nm or less. By setting the thickness of the vapor-deposited layer to 10 nm or more, sufficient continuity of the vapor-deposited layer is likely to be obtained, and by setting the thickness to 500 nm or less, the occurrence of curling and cracks can be sufficiently suppressed, while sufficient gas barrier performance and flexibility are likely to be achieved.

It is preferable that the vapor-deposited layer is formed by a vacuum film-forming means, from the viewpoints of gas barrier performance and film uniformity. Examples of the film-forming means include known methods such as a vacuum vapor deposition method, a sputtering method, and a chemical gas phase deposition method (CVD method); however, from the viewpoint of having a fast film formation speed and high productivity, a vacuum vapor deposition method is preferred. Furthermore, among vacuum vapor deposition methods, a film-forming means based on electron beam heating is particularly effective from the viewpoint that the film formation speed can be easily controlled by the irradiation area, the electron beam current, and the like, and temperature raising or lowering of the vapor deposition material can be performed in a short time.

When there is a plurality of vapor-deposited layers, the vapor-deposited layers may be vapor-deposited layers produced using the same type of material or may be vapor-deposited layers produced using mutually different type of materials.

<Layer Including Polyvinyl Alcohol-Based Resin>

The layer including a polyvinyl alcohol-based resin is provided, for example, on the surface of the paper substrate and is provided for the purpose of improving the adhesiveness between the paper substrate and the vapor-deposited layer or improving the gas barrier properties (particularly, oxygen barrier properties) of the gas barrier laminate. Examples of the polyvinyl alcohol-based resin include a fully saponified polyvinyl alcohol resin, a partially saponified polyvinyl alcohol resin, a modified polyvinyl alcohol resin, and an ethylene-vinyl alcohol copolymerized resin. Furthermore, the degree of polymerization of the polyvinyl alcohol-based resin is preferably 300 or more and 1500 or less. When the degree of polymerization is 300 or more, satisfactory barrier properties and bending resistance of the gas barrier laminate are obtained, and when degree of polymerization is 1500 or less, the viscosity of a coating liquid of a polyvinyl alcohol-based resin that will be described below is lowered so that satisfactory coatability is obtained.

Regarding a method of providing a layer including a polyvinyl alcohol-based resin, for example, the layer can be obtained by applying a coating liquid including the above-mentioned polyvinyl alcohol-based resin and a solvent on a paper substrate and drying the coating liquid. Examples of the solvent that is included in the coating liquid include water, methyl alcohol, ethyl alcohol, isopropyl alcohol, n-propyl alcohol, n-butyl alcohol, n-pentyl alcohol, dimethyl sulfoxide, dimethylformamide, and dimethylacetamide, and in particular, a mixed solvent of water and an alcohol such as methyl alcohol, ethyl alcohol, or isopropyl alcohol is preferred. Furthermore, the coating liquid may also include additives such as a surfactant, an antiseptic agent, a storage stabilizer, a silane coupling agent, an organic titanate, a polyolefin-based emulsion, and an antifoaming agent.

Such a layer including a polyvinyl alcohol-based resin has excellent flexibility, can suppress cracking of the vapor-deposited layer after bending (after folding) to thereby suppress deterioration of the gas barrier properties, and can also improve the adhesiveness between the vapor-deposited layer and the layer including a polyvinyl alcohol-based resin.

The thickness of the layer including a polyvinyl alcohol-based resin may be, for example, 1 μm or more or may be 2 μm or more and may be 5 μm or less. When the thickness is 1 μm or more, the above-mentioned surface unevenness of the paper substrate can be efficiently filled up, and the vapor-deposited layer can be uniformly laminated. Furthermore, when the thickness is 5 μm or less, the vapor-deposited layer can be uniformly laminated while lowering the cost.

<Layer Including Polyolefin>

The gas barrier laminate according to the present embodiment may have, at least on the surface of the vapor-deposited layer on the opposite side from the paper substrate, a layer including a polyolefin, suitably a layer including a polyolefin having at least one selected from a carboxyl group, a salt of a carboxyl group, a carboxylic acid anhydride group, and a carboxylic acid ester. By having such a layer including a polyolefin, the water vapor barrier properties can be improved by the crystallinity of the polyolefin, improvement of the adhesiveness to the vapor-deposited layer and prevention of cracking in the vapor-deposited layer against bending can be further promoted, and at the same time, heat-sealability can be imparted to the gas barrier laminate. By combining various functions in this way, it is not necessary to separately provide an adhesive layer, a protective layer, and a heat-sealable resin layer, and therefore, the amount of use of plastics can be reduced.

The layer including a polyolefin is preferably a coating film obtained by applying and drying a water-based emulsion, and it is preferable that the layer includes a polyolefin emulsion having at least one selected from a carboxyl group, a salt of a carboxyl group, a carboxylic acid anhydride, and a carboxylic acid ester.

When there is a plurality of the layers including a polyolefin, a material of the same type may be used, or different types of materials may be used, for the layers.

Regarding a method of providing the layer including a polyolefin, the layer can be obtained by applying a coating liquid including a material constituting the above-mentioned resin layer and a solvent on the vapor-deposited layer and drying the coating liquid. Examples of the solvent that is included in the coating liquid include water, methyl alcohol, ethyl alcohol, isopropyl alcohol, n-propyl alcohol, n-butyl alcohol, n-pentyl alcohol, dimethyl sulfoxide, dimethylformamide, and dimethylacetamide, and a mixed solvent of water and an alcohol such as methyl alcohol, ethyl alcohol, or isopropyl alcohol is particularly preferred. Furthermore, the coating liquid may also include additives such as a surfactant, an antiseptic agent, a storage stabilizer, a silane coupling agent, an organic titanate anti-blocking agent, a slipping agent, and an antifoaming agent.

The film thickness of the layer including a polyolefin may be, for example, 0.5 μm or more and 10 μm or less. When the film thickness is 0.5 μm or more, sufficient heat seal strength and a sufficient effect of improving the barrier properties are easily obtained, and when the film thickness is 10 μm or less, cost can be lowered, while at the same time, the ratio of paper in the gas barrier laminate according to the present embodiment can be increased.

The gas barrier laminate according to the present embodiment can exhibit sufficient gas barrier properties even after being folded. The term gas barrier properties according to the present specification implies that the water vapor transmission rate and the oxygen transmission rate are sufficiently low.

<Water Vapor Transmission Rate>

With regard to the water vapor transmission rate of the gas barrier laminate according to the present embodiment, when measured by a MOCON method, the water vapor transmission rate is preferably 3 g/m²·day or less, and more preferably 2 g/m²·day or less, under the conditions of a temperature of 40° C. and a relative humidity of 90% RH. When the water vapor transmission rate is 3 g/m²·day or less, a packaging bag produced using the present gas barrier laminate can suppress deterioration of the contents due to moisture absorption and water evaporation over a long period of time.

When the gas barrier laminate according to the present embodiment is folded by placing the paper substrate on the outer side, a roller having a weight of 2 kg is rolled thereon one time, the fold is opened, and the water vapor transmission rate is measured, the water vapor transmission rate is preferably 4 g/m²·day or less, and more preferably 3 g/m²·day or less, under the conditions of a temperature of 40° C. and a relative humidity of 90% RH.

When the gas barrier laminate according to the present embodiment is folded by placing the paper substrate on the inner side, a roller having a weight of 2 kg is rolled thereon one time, the fold is opened, and the water vapor transmission rate is measured, the water vapor transmission rate is preferably 4 $g/m^2$·day or less, and more preferably 3 $g/m^2$·day or less, under the conditions of a temperature of 40° C. and a relative humidity of 90% RH. When the water vapor transmission rate with a fold is 4 $g/m^2$·day or less, even in the case of packaging bags having folds, such as pillow packaging, three-sided seal packaging, and gusset packaging, deterioration of the contents due to moisture absorption and water evaporation can be suppressed over a long period of time.

<Oxygen Transmission Rate>

With regard to the oxygen transmission rate of the gas barrier laminate according to the present embodiment, when measured by a JIS K7126, method B (isopiestic method), the oxygen transmission rate is preferably 2 $cc/m^2/d/atm$ or less, and more preferably 1 $cc/m^2/d/atm$ or less, under the conditions of a temperature of 30° C. and a relative humidity of 70% RH. When the oxygen transmission rate is 2 $cc/m^2/d/$atm or less, a packaging bag produced using the present gas barrier laminate can suppress deterioration of the contents due to oxidation over a long period of time.

With regard to the gas barrier laminate according to the present embodiment, the oxygen transmission rate at 30° C. and 70% RH obtained by folding the gas barrier laminate with the paper substrate placed on the outer side, rolling a roller having a weight of 2 kg thereon one time, opening the fold, and making measurement, is preferably 5 $cc/m^2/d/atm$ or less, and more preferably 3 $cc/m^2/d/atm$ or less.

With regard to the gas barrier laminate according to the present embodiment, the oxygen transmission rate at 30° C. and 70% RH obtained by folding the gas barrier laminate with the paper substrate placed on the inner side, rolling a roller having a weight of 2 kg thereon one time, opening the fold, and making measurement, is preferably 5 $cc/m^2/d/atm$ or less, and more preferably 3 $cc/m^2/d/atm$ or less. When the oxygen transmission rate with a fold is 5 $cc/m^2/d/atm$ or less, even in the case of packaging bags having folds, such as pillow packaging, three-sided seal packaging, and gusset packaging, deterioration of the contents due to oxidation can be suppressed over a long period of time.

Packaging Bag

Figure 2:
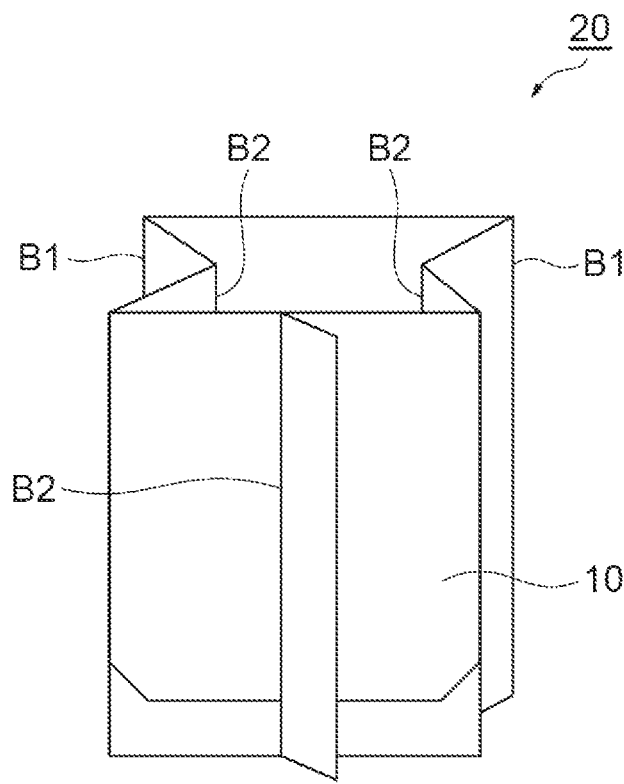
FIG. 2 is a perspective view illustrating a package according to an embodiment of the present invention.

FIG. 2 is a perspective view illustrating a gusset bag 20 formed from the gas barrier laminate 10. A packaging bag is produced by sealing the opening at the top of the gusset bag 20. The gusset bag 20 has sites where the gas barrier laminate 10 is folded (folded parts B1 and B2). A folded part B1 is a site where the gas barrier laminate is valley-folded as viewed from the innermost layer side, and a folded part B2 is a site where the gas barrier laminate 10 is mountain-folded as viewed from the innermost layer side.

The packaging bag may be formed into a bag shape by folding one sheet of a gas barrier laminate in two such that the two parts on the opposite side of the paper substrate face each other, subsequently appropriately folding the gas barrier laminate into a desired shape, and then heat-sealing the resultant, or may be formed into a bag shape by superposing two sheets of a gas barrier laminate such that the opposite sides of the respective paper substrates face each other, and then heat-sealing the gas barrier laminates.

With regard to the packaging bag according to the present embodiment, the heat seal strength may be 3 N/15 mm or more or may be 4 N/15 mm or more. Incidentally, the upper limit value of the heat seal strength is not particularly limited; however, for example, the upper limit may be 10 N/15 mm or less. When the heat seal strength is 3 N/15 mm or more, the contents can be protected in various distribution processes until the packaging bag is opened.

The packaging bag can accommodate contents such as foods and pharmaceuticals as contents. Particularly for foods, the packaging bag is suitable for accommodating confectionery and the like. The packaging bag according to the present embodiment can maintain high gas barrier properties even when the packaging bag has a shape with folded parts. Furthermore, when the ratio of paper is higher, the packaging bag has a potential of being recyclable as recycled paper after use, and the disposal volume of plastic waste can be reduced.

In the present embodiment, a gusset bag has been mentioned as an example of the packaging bag; however, for example, a pillow bag, a three-sided sealed bag, or a standing pouch may also be produced by using the gas barrier laminate according to the present embodiment.

EXAMPLES

Hereinafter, the present invention will be described in more detail by way of Examples; however, the present invention is not intended to be limited to these examples.

<Production of Gas Barrier Laminate>

Examples 1 to 12 and Comparative Example 1

On a clay-coated surface of a paper substrate, a layer including a polyvinyl alcohol-based resin, a vapor-deposited layer, and a layer including a polyolefin were formed in this order, and gas barrier laminates having the configurations shown in the following Table 1 to Table 4 were produced. The layer including a polyvinyl alcohol-based resin and the layer including a polyolefin were formed by applying a coating liquid with a bar coater and drying the coating liquid in an oven, and the vapor-deposited layer was formed by a vacuum vapor deposition method. The materials used are as follows.

Clay-coated paper: Thickness of paper: 50 μm, density of paper: 0.8 $g/cm^3$, thickness of clay-coated layer: 5 μm, density of clay-coated layer: 3 $g/m^3$, basis weight: 60 $g/m^2$ (paper: 43.6 $g/m^2$, clay-coated layer: 16.4 $g/m^2$)

Clay-coated paper: Thickness of paper: 30 μm, density of paper: 0.8 $g/cm^3$, thickness of clay-coated layer: 5 μm, density of clay-coated layer: 3 $g/cm^3$, basis weight: 40 $g/m^2$ (paper: 24.6 $g/m^2$, clay-coated layer: 15.4 $g/m^2$)

Clay-coated paper: Thickness of paper: 100 μm, density of paper: 0.8 $g/cm^3$, thickness of clay-coated layer: 5 μm, density of clay-coated layer: 3 $g/cm^3$, basis weight: 100 $g/m^2$ (paper: 84.2 $g/m^2$, clay-coated layer: 15.8 $g/m^2$)

Polyvinyl alcohol: Degree of saponification 98%, degree of polymerization 500 (manufactured by Kuraray Co., Ltd.)

Modified polyvinyl alcohol: EXCEVAL RS-4104 (manufactured by Kuraray Co., Ltd.)

CHEMIPEARL S500: Polyolefin aqueous dispersion including a salt of a carboxyl group (manufactured by Mitsui Chemicals, Inc.)

The "Ratio of weight of paper substrate" in the tables is a value based on the total weight of the gas barrier laminate, and the "Ratio of thickness of paper substrate" is a value based on the total thickness of the gas barrier laminate.

Examples 13 to 24 and Comparative Examples 2 and 3

On a clay-coated surface of a paper substrate, a layer including a polyolefin, a layer including a polyvinyl alcohol-based resin, a vapor-deposited layer, and a layer including a polyolefin were formed in this order, and gas barrier laminates having the configurations shown in the following Table 5 to Table 8 were produced. The layer including a polyvinyl alcohol-based resin and the layer including a polyolefin were formed by applying a coating liquid with a bar coater and drying the coating liquid in an oven, and the vapor-deposited layer was formed by a vacuum vapor deposition method. The materials used are as follows.

Clay-coated paper: Thickness of paper: 50 μm, density of paper: 0.8 g/cm³, thickness of clay-coated layer: 5 μm, density of clay-coated layer: 3 g/cm³, basis weight: 60 g/m² (paper: 43.6 g/m², clay-coated layer: 16.4 g/m²)

Clay-coated paper: Thickness of paper: 30 μm, density of paper: 0.8 g/cm³, thickness of clay-coated layer: 5 μm, density of clay-coated layer: 3 g/cm³, basis weight: 40 g/m² (paper: 24.6 g/m², clay-coated layer: 15.4 g/m²)

Clay-coated paper: Thickness of paper: 100 μm, density of paper: 0.8 g/cm³, thickness of clay-coated layer: 5 μm, density of clay-coated layer: 3 g/cm³, basis weight: 100 g/m² (paper: 84.2 g/m², clay-coated layer: 15.8 g/m²)

Polyvinyl alcohol: Degree of saponification 98%, degree of polymerization 500 (manufactured by Kuraray Co., Ltd.)

Modified polyvinyl alcohol: EXCEVAL RS-4104 (manufactured by Kuraray Co., Ltd.)

CHEMIPEARL S500: Polyolefin aqueous dispersion including a salt of a carboxyl group (manufactured by Mitsui Chemicals, Inc.)

Examples 25 to 32

On a clay-coated surface of a paper substrate, a layer including a polyolefin, a vapor-deposited layer, a layer including a polyvinyl alcohol-based resin, a vapor-deposited layer, and a layer including a polyolefin were formed in this order, and gas barrier laminates having the configurations shown in the following Table 9 and Table 10 were produced. The layer including a polyvinyl alcohol-based resin and the layer including a polyolefin were formed by applying a coating liquid with a bar coater and drying the coating liquid in an oven, and the vapor-deposited layer was formed by a vacuum vapor deposition method. The materials used are as follows.

Clay-coated paper: Thickness of paper: 50 μm, density of paper: 0.8 g/cm³, thickness of clay-coated layer: 5 μm, density of clay-coated layer: 3 g/cm³, basis weight: 60 g/m² (paper: 43.6 g/m², clay-coated layer: 16.4 g/m²)

Polyvinyl alcohol: Degree of saponification 98%, degree of polymerization 500 (manufactured by Kuraray Co., Ltd.)

Modified polyvinyl alcohol: EXCEVAL RS-4104 (manufactured by Kuraray Co., Ltd.)

CHEMIPEARL S100: Polyolefin aqueous dispersion including a salt of a carboxyl group (manufactured by Mitsui Chemicals, Inc.)

CHEMIPEARL S500: Polyolefin aqueous dispersion including a salt of a carboxyl group CHEMIPEARL V300: Vinyl acetate-based polyolefin aqueous dispersion (manufactured by Mitsui Chemicals, Inc.)

Comparative Example 4

On a surface of paper (clay-coated paper, thickness of paper: 50 μm, thickness of clay-coated layer: 5 μm), a coating liquid including an amidoalkyd resin was applied with a bar coater and dried in an oven, and a layer including an amidoalkyd resin was formed. The thickness of the layer was 4 μm. Subsequently, AL vapor deposition was provided on this layer. The thickness of the AL vapor-deposited layer was 50 nm. Subsequently, a coating liquid including a polyvinyl alcohol resin and TEOS was applied on the AL vapor-deposited layer with a bar coater and dried in an oven, and a layer including a polyvinyl alcohol resin and TEOS was formed. The thickness of the layer was 0.4 μm. Subsequently, a coating liquid including a salt of a carboxyl group (trade name: CHEMIPEARL S500, manufactured by Mitsui Chemicals, Inc.) was applied with a bar coater and dried in an oven, a layer including a polyolefin was formed, and a gas barrier laminate was obtained. The thickness of the layer including a polyolefin was 3 μm.

Comparative Example 5

On a surface of paper (clay-coated paper, thickness of paper: 50 μm, thickness of clay-coated layer: 5 μm), a coating liquid obtained by mixing a water-dispersed slurry of kaolin (BARRISURF HX manufactured by Imerys S.A.) and a styrene-acrylic copolymer emulsion (X-511-374E manufactured by SAIDEN CHEMICAL INDUSTRY CO., LTD.) at a solid content ratio of 1:1 was applied with a bar coater and dried in an oven, and a water vapor barrier resin layer was formed. The thickness of the layer was 15 μm Subsequently, an aqueous solution of polyvinyl alcohol (PVA117 manufactured by Kuraray Co., Ltd.) was applied on this layer with a bar coater and dried in an oven, and a gas barrier layer was formed. The thickness of the layer was 5 μm. Subsequently, a low-density polyethylene (LC602A manufactured by Japan Polyethylene Corporation) was laminated to a thickness of 30 μm by an extrusion lamination method to obtain a gas barrier laminate.

Comparative Example 6

A low-density polyethylene (LC602A manufactured by Japan Polyethylene Corporation) was laminated to a thickness of 30 μm by an extrusion lamination method on a silica vapor-deposited PET film (GL film manufactured by Toppan Inc., thickness 12μ), with a polyurethane-based anchor coating agent interposed therebetween. On the silica vapor-deposited PET film surface side of this laminated film, a polyurethane-based two-liquid curing type adhesive was applied to a dry weight of 5 g/m², and the resultant was dry laminated with paper (clay-coated paper, thickness of paper: 50 μm, thickness of clay-coated layer: 5 μm) to obtain a gas barrier laminate.

<Measurement of Water Vapor Transmission Rate>

The water vapor transmission rates of the gas barrier laminates according to the Examples and Comparative Examples were measured by a MOCON method. The measurement conditions were set to a temperature of 40° C. and a relative humidity of 90%. The water vapor transmission rate of the gas barrier laminate after creating a fold in the gas barrier laminate while rolling a 2-kg roller one time at a rate of 300 mm/min and opening the fold, was also similarly measured. Incidentally, the term "valley-fold" in Table 1 to Table 11 means the gas barrier laminate after valley-folding the gas barrier laminate as viewed from the paper substrate side, and the term "mountain-fold" means the gas barrier laminate after mounting-folding the gas barrier laminate as viewed from the paper substrate side. The results are expressed in the unit [g/m²·day] in Table 1 to Table 11.

Measurement of Oxygen Transmission Rate

The oxygen transmission rates of the gas barrier laminates according to the Examples and Comparative Examples were measured by a JIS K7126, Method B (isopiestic method). As the measuring apparatus, OXTRAN 2/20 manufactured by MOCON, Inc. was used, and measurement was made at a temperature of 30° C. and a relative humidity of 70%. The results are expressed in the unit [cc/m²/d/atm] in Table 1 to Table 11.

<Measurement of Heat Seal Strength>

Two sheets of a gas barrier laminate were superposed such that the paper substrates were placed on the outer side, heat sealing was performed with a heat sealer under the conditions of 120° C. and 0.2 MPa for 1 second, the resultant was cut out therefrom into a short strip having a width of 15 mm, and the maximum load at the time of subjecting the short strip to T-peeling at a peel rate of 300 mm/min was measured. The results are expression in the unit [N/15 mm] in Table 1 to Table 11.

<Evaluation of Performance as Gas Barrier Packaging Bag>

A gas barrier laminate was cut out into a size of 8 cm×18 cm, a gusset packaging bag was produced, the packaging bag was filled with baked confectionery (cookies), and the sealed packaging bag was stored in an environment at a temperature of 40° C. and a relative humidity of 90% for one month. Subsequently, the contents were taken out, and the external appearance and taste were checked. A case in which there was no change before and after the storage was rated as "○", and a case in which clear changes were observed was rated as "X". The results are presented in Table 1 to Table 11.

<Evaluation of Recycled Paper Recyclability>

150 g of a gas barrier laminate was weighed and was subjected to a maceration treatment in alkaline water. Plastic components were removed, the remaining portion was washed with water, and the dry weight of pulp fibers thus collected was measured. A case in which 70 g or more of pulp fibers could be collected was considered to be recyclable and was rated as "○", and a case in which the amount of collected pulp fibers was less than 50 g was considered to be non-recyclable and was rated as "X". The results are presented in Table 1 to Table 11.

TABLE 1

| | | Example 1 | Example 2 | Example 3 | Example 4 |
|---|---|---|---|---|---|
| Thickness of paper substrate | | 50 μm | 50 μm | 50 μm | 50 μm |
| Thickness of clay-coated layer | | 5 μm | 5 μm | 5 μm | 5 μm |
| Thickness of gas barrier laminate | | 61 μm | 59 μm | 63 μm | 61 μm |
| Ratio of weight of paper substrate | | 66% | 68% | 64% | 66% |
| Ratio of thickness of paper substrate | | 82% | 85% | 79% | 82% |
| Layer including polyvinyl alcohol-based resin (thickness) | | Polyvinyl alcohol (3 μm) | Polyvinyl alcohol (1 μm) | Polyvinyl alcohol (5 μm) | Polyvinyl alcohol (3 μm) |
| Vapor-deposited layer (thickness) | | AL (50 nm) | AL (50 nm) | AL (50 nm) | AL (30 nm) |
| Layer including polyolefin (thickness) | | CHEMIPEARL S500 (3 μm) | CHEMIPEARL S500 (3 μm) | CHEMIPEARL S500 (3 μm) | CHEMIPEARL S500 (3 μm) |
| Water vapor Transmission rate | Initial | 1.5 | 1.6 | 1.6 | 1.9 |
| | Mountain-fold | 3.2 | 2.2 | 2.4 | 3.0 |
| | Valley-fold | 2.7 | 3.5 | 2.9 | 3.9 |
| Oxygen Transmission rate | Initial | 0.6 | 0.8 | 0.4 | 1.0 |
| | Mountain-fold | 0.8 | 4.5 | 1.0 | 1.2 |
| | Valley-fold | 1.1 | 6.5 | 2.8 | 1.4 |
| Heat seal strength | | 6.0 | 3.7 | 7.1 | 5.8 |
| Performance as gas barrier packaging bag | | ○ | ○ | ○ | ○ |
| Recycled paper recyclability | | ○ | ○ | ○ | ○ |

TABLE 2

|  |  | Example 5 | Example 6 | Example 7 | Example 8 |
|---|---|---|---|---|---|
| Thickness of paper substrate |  | 50 μm | 50 μm | 50 μm | 30 μm |
| Thickness of clay-coated layer |  | 5 μm | 5 μm | 5 μm | 5 μm |
| Thickness of gas barrier laminate |  | 61 μm | 60 μm | 68 μm | 48 μm |
| Ratio of weight of paper substrate |  | 66% | 67% | 60% | 47% |
| Ratio of thickness of paper substrate |  | 82% | 83% | 74% | 63% |
| Layer including polyvinyl alcohol-based resin (thickness) |  | Polyvinyl alcohol (3 μm) | Polyvinyl alcohol (3 μm) | Polyvinyl alcohol (3 μm) | Polyvinyl alcohol (3 μm) |
| Vapor-deposited layer (thickness) |  | AL (100 nm) | AL (50 nm) | AL (50 nm) | AL (50 nm) |
| Layer including polyolefin (thickness) |  | CHEMIPEARL S500 (3 μm) | CHEMIPEARL S500 (2 μm) | CHEMIPEARL S500 (10 μm) | CHEMIPEARL S500 (10 μm) |
| Water vapor Transmission rate | Initial | 1.2 | 1.6 | 1.3 | 2.2 |
|  | Mountain-fold | 2.1 | 2.9 | 2.3 | 3.2 |
|  | Valley-fold | 2.2 | 3.0 | 2.5 | 3.4 |
| Oxygen Transmission rate | Initial | 0.4 | 0.6 | 0.6 | 1.6 |
|  | Mountain-fold | 0.8 | 1.0 | 0.8 | 2.8 |
|  | Valley-fold | 1.0 | 1.1 | 1.1 | 3.0 |
| Heat seal strength |  | 6.5 | 4.4 | 7.5 | 7.1 |
| Performance as gas barrier packaging bag |  | ○ | ○ | ○ | ○ |
| Recycled paper recyclability |  | ○ | ○ | ○ | ○ |

TABLE 3

|  |  | Example 9 | Example 10 | Example 11 | Example 12 |
|---|---|---|---|---|---|
| Thickness of paper substrate |  | 100 μm | 50 μm | 50 μm | 50 μm |
| Thickness of clay-coated layer |  | 5 μm | 5 μm | 5 μm | 5 μm |
| Thickness of gas barrier laminate |  | 111 μm | 61 μm | 61 μm | 61 μm |
| Ratio of weight of paper substrate |  | 80% | 66% | 66% | 66% |
| Ratio of thickness of paper substrate |  | 90% | 82% | 82% | 82% |
| Layer including polyvinyl alcohol-based resin (thickness) |  | Polyvinyl alcohol (3 μm) | Polyvinyl alcohol (3 μm) | Polyvinyl alcohol (3 μm) | Modified Polyvinyl alcohol (3 μm) |
| Vapor-deposited layer (thickness) |  | AL (50 nm) | Silica (30 nm) | Alumina (30 nm) | AL (50 nm) |
| Layer including polyolefin (thickness) |  | CHEMIPEARL S500 (3 μm) | CHEMIPEARL S500 (3 μm) | CHEMIPEARL S500 (3 μm) | CHEMIPEARL S500 (3 μm) |
| Water vapor Transmission rate | Initial | 0.8 | 1.0 | 1.8 | 0.5 |
|  | Mountain-fold | 3.0 | 2.6 | 3.0 | 1.3 |
|  | Valley-fold | 3.8 | 3.0 | 3.5 | 2.3 |
| Oxygen Transmission rate | Initial | 0.6 | 0.6 | 0.6 | 0.6 |
|  | Mountain-fold | 2.8 | 1.0 | 1.0 | 1.9 |
|  | Valley-fold | 4.5 | 1.2 | 1.1 | 1.6 |

TABLE 3-continued

|  | Example 9 | Example 10 | Example 11 | Example 12 |
|---|---|---|---|---|
| Heat seal strength | 6.1 | 4.5 | 4.2 | 4.7 |
| Performance as gas barrier packaging bag | ◯ | ◯ | ◯ | ◯ |
| Recycled paper recyclability | ◯ | ◯ | ◯ | ◯ |

TABLE 4

|  | Comparative Example 1 |
|---|---|
| Thickness of paper substrate | 50 μm |
| Thickness of clay-coated layer | 5 μm |
| Thickness of laminate | 61 μm |
| Ratio of weight of paper substrate | 66% |
| Ratio of thickness of paper substrate | 82% |
| Layer including polyvinyl alcohol-based resin (thickness) | Polyvinyl alcohol (3 μm) |
| Vapor-deposited layer | — |

TABLE 4-continued

|  |  | Comparative Example 1 |
|---|---|---|
| (thickness) |  |  |
| Layer including polyolefin (thickness) |  | CHEMIPEARL S500 (3 μm) |
| Water vapor Transmission rate | Initial | 110 |
|  | Mountain-fold | 150 |
|  | Valley-fold | 160 |
| Oxygen Transmission rate | Initial | 25 |
|  | Mountain-fold | 25 |
|  | Valley-fold | 25 |
| Heat seal strength |  | 3.5 |
| Performance as gas barrier packaging bag |  | X |
| Recycled paper recyclability |  | ◯ |

TABLE 5

|  |  | Example 13 | Example 14 | Example 15 | Example 16 |
|---|---|---|---|---|---|
| Thickness of paper substrate |  | 50 μm | 50 μm | 50 μm | 50 μm |
| Thickness of clay-coated layer |  | 5 μm | 5 μm | 5 μm | 5 μm |
| Thickness of gas barrier laminate |  | 62 μm | 64 μm | 64 μm | 62 μm |
| Ratio of weight of paper substrate |  | 65% | 63% | 63% | 65% |
| Ratio of thickness of paper substrate |  | 81% | 78% | 78% | 81% |
| Layer including polyolefin (thickness) |  | CHEMIPEARL S500 (3 μm) | CHEMIPEARL S500 (1 μm) | CHEMIPEARL S500 (5 μm) | CHEMIPEARL S500 (3 μm) |
| Layer including polyvinyl alcohol-based resin (thickness) |  | Polyvinyl alcohol (1 μm) | Polyvinyl alcohol (5 μm) | Polyvinyl alcohol (1 μm) | Polyvinyl alcohol (1 μm) |
| Vapor-deposited layer (thickness) |  | AL (50 nm) | AL (50 nm) | AL (50 nm) | AL (30 nm) |
| Layer including polyolefin (thickness) |  | CHEMIPEARL S500 (3 μm) | CHEMIPEARL S500 (3 μm) | CHEMIPEARL S500 (3 μm) | CHEMIPEARL S500 (3 μm) |
| Water vapor Transmission rate | Initial | 1.2 | 2.0 | 1.6 | 2.0 |
|  | Mountain-fold | 1.8 | 2.1 | 2.0 | 2.5 |
|  | Valley-fold | 2.5 | 2.1 | 2.0 | 3.0 |
| Oxygen Transmission rate | Initial | 0.9 | 0.6 | 1.7 | 1.1 |
|  | Mountain-fold | 1.2 | 0.8 | 2.1 | 1.3 |
|  | Valley-fold | 2.0 | 1.2 | 2.1 | 1.2 |
| Heat seal strength |  | 5.6 | 6.1 | 5.9 | 4.9 |
| Performance as gas barrier packaging bag |  | ◯ | ◯ | ◯ | ◯ |
| Recycled paper recyclability |  | ◯ | ◯ | ◯ | ◯ |

TABLE 6

|  |  | Example 17 | Example 18 | Example 19 | Example 20 |
|---|---|---|---|---|---|
| Thickness of paper substrate |  | 50 μm | 50 μm | 50 μm | 30 μm |
| Thickness of clay-coated layer |  | 5 μm | 5 μm | 5 μm | 5 μm |
| Thickness of gas barrier laminate |  | 62 μm | 61 μm | 69 μm | 49 μm |
| Ratio of weight of paper substrate |  | 65% | 66% | 59% | 47% |
| Ratio of thickness of paper substrate |  | 81% | 82% | 72% | 61% |
| Layer including polyolefin (thickness) |  | CHEMIPEARL S500 (3 μm) | CHEMIPEARL S500 (3 μm) | CHEMIPEARL S500 (3 μm) | CHEMIPEARL S500 (3 μm) |
| Layer including polyvinyl alcohol-based resin (thickness) |  | Polyvinyl alcohol (1 μm) | Polyvinyl alcohol (1 μm) | Polyvinyl alcohol (1 μm) | Polyvinyl alcohol (1 μm) |
| Vapor-deposited layer (thickness) |  | AL (100 nm) | AL (50 nm) | AL (50 nm) | AL (50 nm) |
| Layer including polyolefin (thickness) |  | CHEMIPEARL S500 (3 μm) | CHEMIPEARL S500 (2 μm) | CHEMIPEARL S500 (10 μm) | CHEMIPEARL S500 (10 μm) |
| Water vapor Transmission rate | Initial | 0.9 | 1.3 | 1.5 | 1.3 |
|  | Mountain-fold | 1.0 | 1.5 | 2.2 | 1.8 |
|  | Valley-fold | 1.3 | 2.2 | 2.5 | 2.3 |
| Oxygen Transmission rate | Initial | 0.5 | 1.0 | 1.4 | 1.2 |
|  | Mountain-fold | 0.7 | 1.4 | 1.9 | 2.3 |
|  | Valley-fold | 0.7 | 1.9 | 2.2 | 2.8 |
| Heat seal strength |  | 5.2 | 4.0 | 6.7 | 7.0 |
| Performance as gas barrier packaging bag |  | ○ | ○ | ○ | ○ |
| Recycled paper recyclability |  | ○ | ○ | ○ | ○ |

TABLE 7

|  |  | Example 21 | Example 22 | Example 23 | Example 24 |
|---|---|---|---|---|---|
| Thickness of paper substrate |  | 100 μm | 50 μm | 50 μm | 50 μm |
| Thickness of clay-coated layer |  | 5 μm | 5 μm | 5 μm | 5 μm |
| Thickness of gas barrier laminate |  | 112 μm | 62 μm | 62 μm | 62 μm |
| Ratio of weight of paper substrate |  | 79% | 65% | 65% | 65% |
| Ratio of thickness of paper substrate |  | 89% | 81% | 81% | 81% |
| Layer including polyolefin (thickness) |  | CHEMIPEARL S500 (3 μm) | CHEMIPEARL S500 (3 μm) | CHEMIPEARL S500 (3 μm) | CHEMIPEARL S500 (3 μm) |
| Layer including polyvinyl alcohol-based resin (thickness) |  | Polyvinyl alcohol (1 μm) | Polyvinyl alcohol (1 μm) | Polyvinyl alcohol (1 μm) | Modified Polyvinyl alcohol (1 μm) |
| Vapor-deposited layer (thickness) |  | AL (50 nm) | Silica (30 nm) | Alumina (30 nm) | AL (50 nm) |
| Layer including polyolefin (thickness) |  | CHEMIPEARL S500 (3 μm) | CHEMIPEARL S500 (3 μm) | CHEMIPEARL S500 (3 μm) | CHEMIPEARL S500 (3 μm) |
| Water vapor Transmission rate | Initial | 1.6 | 0.9 | 1.9 | 0.9 |
|  | Mountain-fold | 1.8 | 1.4 | 2.0 | 1.4 |
|  | Valley-fold | 2.3 | 1.8 | 2.2 | 1.5 |

TABLE 7-continued

|  |  | Example 21 | Example 22 | Example 23 | Example 24 |
|---|---|---|---|---|---|
| Oxygen Transmission rate | Initial | 1.3 | 0.7 | 0.9 | 1.0 |
|  | Mountain-fold | 1.5 | 0.9 | 1.5 | 1.8 |
|  | Valley-fold | 2.0 | 1.1 | 2.0 | 2.0 |
| Heat seal strength |  | 4.8 | 4.6 | 5.0 | 4.5 |
| Performance as gas barrier packaging bag |  | ○ | ○ | ○ | ○ |
| Recycled paper recyclability |  | ○ | ○ | ○ | ○ |

TABLE 8

|  | Comparative Example 2 | Comparative Example 3 |
|---|---|---|
| Thickness of paper substrate | 50 μm | 50 μm |
| Thickness of clay-coated layer | 5 μm | 5 μm |
| Thickness of laminate | 62 μm | 61 μm |
| Ratio of weight of paper substrate | 65% | 66% |
| Ratio of thickness of paper substrate | 81% | 82% |
| Layer including polyolefin (thickness) | CHEMIPEARL S500 (3 μm) | CHEMIPEARL S500 (3 μm) |
| Layer including polyvinyl alcohol-based resin (thickness) | Polyvinyl alcohol (1 μm) | — |
| Vapor-deposited layer (thickness) | — | AL (50 nm) |
| Layer including polyolefin (thickness) | CHEMIPEARL S500 (3 μm) | CHEMIPEARL S500 (3 μm) |
| Water vapor Transmission rate | Initial 110 | 1.3 |
|  | Mountain-fold 150 | 1.1 |
|  | Valley-fold 160 | 2.2 |
| Oxygen Transmission rate | Initial 25 | 150 |
|  | Mountain-fold 25 | 150 |
|  | Valley-fold 25 | 150 |
| Heat seal strength | 4.7 | 4.9 |
| Performance as gas barrier packaging bag | X | X |
| Recycled paper recyclability | ○ | ○ |

TABLE 9

|  |  | Example 25 | Example 26 | Example 27 | Example 28 |
|---|---|---|---|---|---|
| Thickness of paper substrate |  | 50 μm | 50 μm | 50 μm | 50 μm |
| Thickness of clay-coated layer |  | 5 μm | 5 μm | 5 μm | 5 μm |
| Thickness of gas barrier laminate |  | 64 μm | 64 μm | 64 μm | 64 μm |
| Ratio of weight of paper substrate |  | 63% | 63% | 63% | 64% |
| Ratio of thickness of paper substrate |  | 78% | 78% | 78% | 78% |
| Layer including polyolefin (thickness) |  | CHEMIPEARL S100 (3 μm) | CHEMIPEARL S100 (3 μm) | CHEMIPEARL S500 (3 μm) | CHEMIPEARL S100 (4 μm) |
| Vapor-deposited layer (thickness) |  | AL (50 nm) | AL (50 nm) | AL (50 nm) | AL (50 nm) |
| Layer including polyvinyl alcohol-based resin (thickness) |  | Polyvinyl alcohol (3 μm) | Modified Polyvinyl alcohol (3 μm) | Polyvinyl alcohol (3 μm) | Polyvinyl alcohol (0.7 μm) |
| Vapor-deposited layer (thickness) |  | AL (50 nm) | AL (50 nm) | AL (50 nm) | AL (50 nm) |
| Layer including polyolefin (thickness) |  | CHEMIPEARL S100 (3 μm) | CHEMIPEARL S100 (3 μm) | CHEMIPEARL S500 (3 μm) | CHEMIPEARL S100 (4 μm) |
| Water vapor Transmission rate | Initial | 0.6 | 0.5 | 0.7 | 0.1 |
|  | Mountain-fold | 0.7 | 0.5 | 0.8 | 0.2 |
|  | Valley-fold | 1.0 | 0.7 | 0.9 | 0.3 |

TABLE 9-continued

| | | Example 25 | Example 26 | Example 27 | Example 28 |
|---|---|---|---|---|---|
| Oxygen Transmission rate | Initial | 0.4 | 0.8 | 0.4 | 0.9 |
| | Mountain-fold | 0.5 | 0.9 | 0.5 | 1.0 |
| | Valley-fold | 0.7 | 1.1 | 0.7 | 1.3 |
| Heat seal strength | | 4.2 | 4.4 | 4.2 | 4.6 |
| Performance as gas barrier packaging bag | | ○ | ○ | ○ | ○ |
| Recycled paper recyclability | | ○ | ○ | ○ | ○ |

TABLE 10

| | | Example 29 | Example 30 | Example 31 | Example 32 |
|---|---|---|---|---|---|
| Thickness of paper substrate | | 50 μm | 50 μm | 50 μm | 50 μm |
| Thickness of clay-coated layer | | 5 μm | 5 μm | 5 μm | 5 μm |
| Thickness of gas barrier laminate | | 64 μm | 64 μm | 64 μm | 62 μm |
| Ratio of weight of paper substrate | | 63% | 63% | 63% | 66% |
| Ratio of thickness of paper substrate | | 78% | 78% | 78% | 81% |
| Layer including resin (thickness) | | CHEMIPEARL S100 (3 μm) | CHEMIPEARL S100 (3 μm) | Polyvinyl alcohol (3 μm) | CHEMIPEARL V300 (3 μm) |
| Vapor-deposited layer (thickness) | | AL (50 nm) | AL (50 nm) | AL (50 nm) | AL (50 nm) |
| Layer including polyvinyl alcohol-based resin (thickness) | | Polyvinyl alcohol (3 μm) | Polyvinyl alcohol (3 μm) | Polyvinyl alcohol (3 μm) | Polyvinyl alcohol (0.7 μm) |
| Vapor-deposited layer (thickness) | | Silica (30 nm) | Alumina (30 nm) | AL (50 nm) | AL (50 nm) |
| Layer including polyolefin (thickness) | | CHEMIPEARL S100 (3 μm) | CHEMIPEARL S100 (3 μm) | CHEMIPEARL S100 (3 μm) | CHEMIPEARL S100 (3 μm) |
| Water vapor Transmission rate | Initial | 0.4 | 0.9 | 1.0 | 0.8 |
| | Mountain-fold | 0.5 | 1.1 | 1.1 | 1.0 |
| | Valley-fold | 0.7 | 1.5 | 1.2 | 1.2 |
| Oxygen Transmission rate | Initial | 0.4 | 0.5 | 0.1 | 0.4 |
| | Mountain-fold | 0.5 | 0.5 | 0.1 | 0.6 |
| | Valley-fold | 0.7 | 0.7 | 0.2 | 0.6 |
| Heat seal strength | | 4.1 | 4.5 | 4.4 | 4.2 |
| Performance as gas barrier packaging bag | | ○ | ○ | ○ | ○ |
| Recycled paper recyclability | | ○ | ○ | ○ | ○ |

TABLE 11

| | Comparative Example 4 | Comparative Example 5 | Comparative Example 6 |
|---|---|---|---|
| Thickness of paper substrate | 50 μm | 50 μm | 50 μm |
| Thickness of clay-coated layer | 5 μm | 5 μm | 5 μm |
| Thickness of laminate | 62 μm | 105 μm | 102 μm |
| Ratio of weight of paper substrate | 65% | 30% | 39% |
| Ratio of thickness of paper substrate | 80% | 48% | 49% |
| Layer configuration (thickness) | Amidoalkyd resin (4 μm) AL (50 nm) PVA + TEOS | Water vapor barrier layer (15 μm) Gas barrier layer (5 μm) | Adhesive (5 μm) Silica vapor-deposited |

TABLE 11-continued

| | | Comparative Example 4 | Comparative Example 5 | Comparative Example 6 |
|---|---|---|---|---|
| | | (0.4 µm) CHEMIPEARL S500 (3 µm) | LDPE (30 µm) | PET (12 µm) LDPE (30 µm) |
| Water vapor Transmission rate | Initial | 3.0 | 1.5 | 0.3 |
| | Mountain-fold | 5.0 | 1.7 | 0.9 |
| | Valley-fold | 15 | 1.8 | 1.2 |
| Oxygen Transmission rate | Initial | 5.0 | 1.0 | 0.3 |
| | Mountain-fold | 150 | 1.2 | 1.0 |
| | Valley-fold | 150 | 1.3 | 1.5 |
| Heat seal strength | | 4.1 | 6.5 | 8.2 |
| Performance as gas barrier packaging bag | | X | ○ | ○ |
| Recycled paper recyclability | | ○ | X | X |

REFERENCE SIGNS LIST

1: paper substrate, 2: layer including polyvinyl alcohol-based resin, 3: vapor-deposited layer, 4: layer including polyolefin, 10: gas barrier laminate, 20: gusset bag, B1, B2: folded part.

The invention claimed is:

1. A gas barrier laminate being capable of hermetic sealing by heat sealing, the gas barrier laminate comprising a paper substrate and a vapor-deposited layer, wherein the paper substrate has a basis weight of 30 to 100 g/m$^2$;

a water vapor transmission rate is 3 g/m$^2$ day or less at 40° C. and 90% RH, and an oxygen transmission rate is 2 cc/m$^2$/d/atm or less at 30° C. and 70% RH;

the water vapor transmission rate obtained by folding the gas barrier laminate with the paper substrate placed on an outer side, rolling a roller having a weight of 2 kg thereon one time, opening a fold, and making measurement, is 4 g/m$^2$ day or less at 40° C. and 90% RH, and the oxygen transmission rate obtained in a same manner is 5 cc/m$^2$/d/atm or less at 30° C. and 70% RH;

the water vapor transmission rate obtained by folding the gas barrier laminate with the paper substrate placed on an inner side, rolling a roller having a weight of 2 kg thereon one time, opening a fold, and making measurement, is 4 g/m$^2$ day or less at 40° C. and 90% RH, and the oxygen transmission rate obtained in a same manner is 5 cc/m$^2$/d/atm or less at 30° C. and 70% RH;

a weight of the paper substrate is 47% by mass or more with respect to a gross weight of the gas barrier laminate, wherein the gas barrier laminate further comprises a polyolefin layer in direct contact with a surface of the vapor-deposited layer on an opposite side from the paper substrate, the polyolefin layer including a polyolefin having at least one selected from a carboxyl group, a salt of a carboxyl group, a carboxylic acid anhydride group, and a carboxylic acid ester.

2. The gas barrier laminate according to claim 1, wherein the weight of the paper substrate is 60% by mass or more with respect to the gross weight of the gas barrier laminate.

3. The gas barrier laminate according to claim 1, further comprising a layer including a polyvinyl alcohol-based resin between the paper substrate and the vapor-deposited layer.

4. A gas barrier laminate being capable of hermetic sealing by heat sealing, the gas barrier laminate comprising a paper substrate and a vapor-deposited layer, wherein the paper substrate has a basis weight of 30 to 100 g/m$^2$;

a water vapor transmission rate is 3 g/m$^2$ day or less at 40° C. and 90% RH, and an oxygen transmission rate is 2 cc/m$^2$/d/atm or less at 30° C. and 70% RH;

the water vapor transmission rate obtained by folding the gas barrier laminate with the paper substrate placed on an outer side, rolling a roller having a weight of 2 kg thereon one time, opening a fold, and making measurement, is 4 g/m$^2$ day or less at 40° C. and 90% RH, and the oxygen transmission rate at 30° C. and 70% RH obtained in a same manner is 5 cc/m$^2$/d/atm or less;

the water vapor transmission rate at 40° C. and 90% RH obtained by folding the gas barrier laminate with the paper substrate placed on an inner side, rolling a roller having a weight of 2 kg thereon one time, opening a fold, and making measurement, is 4 g/m$^2$ day or less, while the oxygen transmission rate at 30° C. and 70% RH obtained in a same manner is 5 cc/m$^2$/d/atm or less; and a thickness of the paper substrate is 60% or more with respect to the entire gas barrier laminate, wherein the gas barrier laminate further comprises a polyolefin layer in direct contact with a surface of the vapor-deposited layer on an opposite side from the paper substrate, the polyolefin layer including a polyolefin having at least one selected from a carboxyl group, a salt of a carboxyl group, a carboxylic acid anhydride group, and a carboxylic acid ester.

5. The gas barrier laminate according to claim 4, wherein the thickness of the paper substrate is 70% or more of the thickness of the entire gas barrier laminate.

6. The gas barrier laminate according to claim 4, further comprising a layer including a polyvinyl alcohol-based resin between the paper substrate and the vapor-deposited layer.

7. A packaging bag comprising the gas barrier laminate according to claim 1, the packaging bag having a heat seal strength of 3 N/15 mm or more.

8. The packaging bag according to claim 7, having a folded part.

9. A packaging bag comprising the gas barrier laminate according to claim 4, the packaging bag having a heat seal strength of 3 N/15 mm or more.

10. The packaging bag according to claim 9, having a folded part.

* * * * *